United States Patent [19]

Gozdz et al.

[11] Patent Number: 5,540,741
[45] Date of Patent: *Jul. 30, 1996

[54] LITHIUM SECONDARY BATTERY EXTRACTION METHOD

[75] Inventors: Antoni S. Gozdz, Tinton Falls; Caroline N. Schmutz, Eatontown; Jean-Marie Tarascon, Martinsville; Paul C. Warren, Far Hills, all of N.J.

[73] Assignee: Bell Communications Research, Inc., Morristown, N.J.

[ * ] Notice: The term of this patent shall not extend beyond the expiration date of Pat. No. 5,460,904.

[21] Appl. No.: 373,143

[22] Filed: Jan. 17, 1995

Related U.S. Application Data

[63] Continuation-in-part of Ser. No. 160,018, Nov. 13, 1993, Pat. No. 5,460,904, which is a continuation-in-part of Ser. No. 110,262, Aug. 23, 1993, Pat. No. 5,418,191, which is a continuation-in-part of Ser. No. 26,904, Mar. 5, 1993, Pat. No. 5,296,318.

[51] Int. Cl.⁶ .................................................. H01M 10/38
[52] U.S. Cl. .............................................. 29/623.5; 429/192
[58] Field of Search .................................. 29/623.5, 623.1, 29/623.2, 623.4; 429/192

[56] References Cited

U.S. PATENT DOCUMENTS 5,219,680  6/1993  Fauteux .................................... 429/192

Primary Examiner—John S. Maples
Attorney, Agent, or Firm—Leonard Charles Suchyta; Lionel N. White

[57] ABSTRACT

The present invention is a method of fabricating a rechargeable battery structure by extracting plasticizer from plastic battery preforms to render them insensitive to water while maintaining the homogeneous characteristics of the plastic materials to allow subsequent activation of the batteries through the introduction of an electrolyte solution. These battery preforms need not be maintained under anhydrous conditions and can be activated immediately preceding use thereof.

26 Claims, 5 Drawing Sheets

LITHIUM SECONDARY BATTERY EXTRACTION METHOD

RELATED APPLICATIONS

This application is a continuation-in-part of U.S. patent application Ser. No. 08/160,018 filed 30 Nov. 1993, now U.S. Pat. No. 5,460,904 which is a continuation in part of U.S. patent application Ser. No. 08/110,262 filed 23 Aug. 1993, now U.S. Pat. No. 5,418,091 which is a continuation-in-part of U.S. patent application Ser. No. 08/026,904 filed 5 Mar. 1993, now U.S. Pat. No. 5,296,318, all of which are assigned to the assignee of this application.

BACKGROUND OF THE INVENTION

The invention relates to a unitary lithium secondary battery having a laminated electrode and separator membrane structure. More particularly, the invention further relates to a method of extracting plasticizer from the structure to provide a battery which may be stored for an extended period of time without the need for anhydrous conditions since no electrolyte solution, i.e., lithium salt, is present.

Early rechargeable lithium cells utilized lithium metal electrodes as the ion source in conjunction with positive electrodes comprising compounds capable of intercalating the lithium ions within their structure during discharge of the cell. Such cells relied, for the most part, on porous separator structures (fiber mats) or membranes which physically contained a measure of fluid electrolyte, usually in the form of a solution of a lithium compound, and which also provided a means for preventing destructive contact between the electrodes of the cell. Sheets or membranes ranging from glass fiber filter paper or cloth to microporous polyolefin film or nonwoven fabric have been saturated with solution of a lithium compound, such as $LiClO_4$, $LiPF_6$ or $LiBF_4$, in an organic solvent, e.g., propylene carbonate, diethoxyethane, or ethylene carbonate or their mixtures, to form such electrolyte/separator elements. The fluid electrolyte bridge thus established between the electrodes has effectively provided the necessary $Li^+$ ion mobility at conductivities in the range of about $10^{31\ 3}$ S/cm.

By contrast, in the present invention, Li ion mobility is provided through the polymeric network which makes up not only the separator but also the electrodes of the layered unitary battery structure of the present invention.

Although prior art separator membranes were often formed of polymeric materials, prior art battery structures of discrete electrodes and separator membranes had numerous disadvantages over the unitary battery structures of the present invention. One prior art separator membrane, as disclosed in U.S. Pat. No. 3,351,495, is composed of a polyolefin material which may contain a plasticizer and a filler. When the polyolefin is mixed with a plasticizer and a filler material, the mixture is extruded to form a sheet and then a sufficient amount of plasticizer is removed to provide a finished separator membrane. The removal of the plasticizer is necessary to provide a void volume within the polyolefin which creates a microporous structure for introduction of the electrolytic fluid.

Although serving well in this role of ion conductor, these separator elements unfortunately comprise sufficiently large solution-containing voids that continuous avenues may be established between the electrodes, thereby enabling lithium dendrite formation during charging cycles which eventually leads to internal cell short-circuiting. Some success has been achieved in combatting this problem through the use of lithium-ion cells in which both electrodes comprise intercalation materials, such as lithiated manganese oxide and carbon (U.S. Pat. No. 5,196,279), thereby eliminating the lithium metal which promotes the deleterious dendrite growth. Although providing efficient power sources, these lithium-ion cells do not readily attain the capacity provided by lithium metal electrodes.

Another approach to controlling the dendrite problem has been the use of continuous films or bodies of polymeric materials which provide little or no continuous free path of low viscosity fluid in which the lithium dendrite may propagate. These materials may comprise polymers, e.g., poly(alkene oxide), which are enhanced in ionic conductivity by the incorporation of a salt, typically a lithium salt such as $LiClO_4$, $LiPF_6$, or the like. A range of practical ionic conductivity, i.e., over about $10^{-5}$ to $10^{-3}$ S/cm, was however, only attainable with these polymers at ambient conditions well above room temperature. Some improvement in the conductivity of the more popular polyethylene oxide (PEO) compositions has been reported to have been achieved by controlling the high temperature mechanical stresses of the PEO by radiation-induced crosslinking (U.S. Pat. No. 5,009,970) or by meticulous blending with exotic ion-solvating polymer compositions (U.S. Pat. No. 5,041,346). Each of these attempts achieved limited success due to attendant expense and restricted implementation in commercial practice.

An example of the foregoing has been the use of polymer host network electrolytes as described, for example, in U.S. Pat. Nos. 5,219,680 ; 4,925,752; and 4,303,748. The advantage of these polymer host networks is the ability to form battery structures which are small and have good conductivities. Like the present invention, these solid state electrolytes may be useful in forming unitary solid state batteries. The solid state batteries described in these patents are, however, water-sensitive and must be protected from moisture during production and post-production storage. These battery elements, i.e., electrodes and separators, are produced by the inclusion of the electrolytic salt as a component of the polymer material prior to forming of the elements.

The present invention provides a means for avoiding the disadvantages of prior electrolytic cell compositions and constructions by enabling the ready and economical preparation of strong, flexible unitary laminated battery cells which will readily retain electrolyte salt solutions and remain functional over a range extending well below room temperature, as well as avoiding water sensitivity and providing storage stability in an uncontrolled environment over a long period of time.

SUMMARY OF THE INVENTION

It is therefore an object of the invention to overcome these and other difficulties encountered in the prior art.

Another object of the present invention is to provide a unitary battery structure which is storage-stable, water insensitive and functional over a wide temperature range.

A further object of the present invention is to provide a method of making a cell or battery structure without the need for anhydrous conditions.

Still another object of the present invention is to provide a safe and economical method of extracting polymer plasticizer from a solid state battery structure under supercritical conditions.

Still another object of the present invention is to provide a method of making a cell or battery structure in which all layers are permanently bonded together thus avoiding the need for external pressure to keep these layers in close contact.

Further advantages of the invention will be set forth in part in the description which follows and in part will be apparent from the description, or may be learned by practice of the invention. The advantages of the invention may be realized and attained by means of the instrumentalities and combinations particularly pointed out in the appended claims.

To achieve the foregoing advantages and in according with the purpose of the invention, as embodied and broadly described herein, there is disclosed:

A method of making a battery structure including forming a solid state positive electrode of a polymer, a plasticizer and an active material; forming a solid state negative electrode of a polymer, a plasticizer and an active material; forming a separator membrane of a polymeric material which is capable of reswelling to form a homogeneous material upon contact with an electrolytic salt and a plasticizer; extracting a portion of said plasticizer from at least said separator membrane; and reswelling at least said separator membrane by contacting said separator membrane with an electrolytic salt solution.

There is also disclosed a method of forming a separator membrane including providing a polymeric material having an intrinsic affinity toward lithium salt solutions; contacting this material with a solvent to extract substantially all additives and contaminants therefrom; wherein the material swells upon contact with a lithium salt solution.

There is still further disclosed a method of making a battery structure including forming a positive electrode of a copolymer of vinylidene fluoride (VdF) and hexafluoropropylene (HFP), $LiMn_2O_4$ and dibutyl phthalate (DBP); forming a negative electrode of a copolymer of VdF and HFP, carbon and DBP; forming a separator membrane of a copolymer of VdF and HFP with DBP; laminating the electrodes and the separator membrane under heat and pressure to form a unitary battery structure; extracting at least a portion of the DBP from said battery structure with diethyl ether; drying the battery in a stream of air; placing the battery under vacuum for a period of from 0 to 30 minutes; and activating the battery by reswelling the battery structure with a lithium salt electrolytic solution.

BRIEF DESCRIPTION OF THE DRAWING

The present invention will be described with reference to the accompanying drawing of which.

DESCRIPTION OF THE INVENTION

The present invention is directed to the formation of plastic batteries with extended shelf life, long battery life, high discharge rates, and simplified handling. These characteristics are achieved by extracting at least a portion of a plasticizer from the solid state elements of a unitary battery structure.

In one embodiment of the present invention, a lithium battery includes a terminal layer of aluminum grid which may be coated with a dispersion of an intercalation electrode composition, e.g., a $LiMn_2O_4$ powder in a polymer matrix solution, and which is dried to form a positive electrode. A hybrid electrolyte separator layer can then be formed on the positive electrode from a coating of a composition comprising a solution of a copolymer and a plasticizer. A lithium foil electrode and a copper terminal foil or grid can then in turn be pressed onto the assembly to complete the cell structure.

In a lithium-ion cell, a copper foil coated with carbon, e.g., petroleum coke or graphite, dispersed in a composition of the electrolyte copolymer can be substituted for the lithium metal and terminal foils. Although this process lends itself desirably to continuous production of battery cells, if the electrolytic salt is introduced during the assembly stage, the hygroscopic property thereof imposes extreme limitations on the conditions under which the coating and cell assembly operations are carried out.

A preferred alternative procedure for constructing such a battery comprises the formation of the electrode elements, by coating or otherwise, followed by assembly of the resulting electrodes with an intermediate separator membrane as described above. At this assembly stage, the separator membrane and both electrode films are substantially devoid of the hygroscopic electrolyte salt. Only during the final battery activation operation when the electrolyte salt solution is introduced into the battery cell is there concern for maintaining anhydrous conditions, as may be effectively achieved in an atmosphere of dry, inert gas. Once in contact with the assembled separator body, the salt solution readily migrates through the grid and into the membrane matrix to provide substantially the same conductivity enhancement as achieved by a preformed hybrid electrolyte film.

In another embodiment of the present invention, electrolyte cells, such as rechargeable battery cells, are constructed by means of the lamination of electrode and electrolyte cell elements which are individually prepared by coating, extrusion, skiving or otherwise, from compositions which are capable of forming substantially self-supporting films and which when mixed with an electrolytic salt, are homogeneously miscible therewith.

In one example of the production of a lithium-ion battery, a current collector layer of aluminum foil or grid is overlaid with a positive electrode film or membrane separately prepared as a coated layer of a dispersion of intercalation electrode composition, e.g., a $LiMn_2O_4$ powder in a plasticized polymer matrix solution, which is dried to form a membrane. An electrolyte/separator membrane formed as a solution of a polymer and a plasticizer is then overlaid upon the positive electrode film. A negative electrode membrane formed as a dried coating of a powdered carbon dispersion in a copolymer matrix solution is similarly overlaid upon the separator membrane layer, and a copper collector foil or grid is laid upon the negative electrode layer to complete the cell assembly. This assembly is then heated under pressure to cause heat-fused bonding between the plasticized polymer matrix components and the collector grids to thereby effect the lamination of the cell elements into a unitary flexible battery cell structure.

At this stage, the laminated structure comprises a significant measure of homogeneously distributed organic plasticizer, in all three layers, yet is devoid of hygroscopic electrolyte salt. As a result, the "inactive" battery cell may be stored at ambient conditions, either before of after being shaped or further processed, without concern for electrolyte deterioration due to reaction with atmospheric moisture. Only during final assembly when an electrolyte salt solution is introduced to activate the battery cell need there be concern for anhydrous conditions.

When it is desired to activate a battery in the final stage of manufacture, the laminate cell structure is immersed in or otherwise contacted with an electrolyte salt solution which will be imbibed into the polymer matrix to provide substantially the same ionic conductivity enhancement as achieved by a preformed hybrid electrolyte/separator film containing such an electrolyte salt solution. In order to obtain a battery system substantially devoid of deleterious contaminants, it is preferred that a substantial portion of the plasticizer solvent be previously removed from the polymer matrix before absorption of the electrolyte. Absorption of the electrolyte may also be facilitated by exchange of the plasticizer for electrolyte salt solution under the appropriate circumstances.

Polymers which may be used to define the solid state portion of either electrode and/or the separator membrane may be selected from, for example, copolymers of VdF (vinylidene fluoride) and HFP (hexafluoropropylene), PVC, PAN and the like. More particularly, the polymer may be selected from polymers and copolymers of vinyl chloride, acrylonitrile, vinylidene fluoride, vinyl chloride and vinylidene chloride, vinyl chloride and acrylonitrile, vinylidene fluoride with hexafluoropropylene, vinylidene fluoride with hexafluoropropylene and a member of the group consisting of vinyl fluoride, tetrafluoroethylene, an trifluoroethylene. The preferred polymer composition is a copolymer of VdF and HFP, more preferably, the polymer composition is 75 to 92% vinylidene fluoride and 8 to 25% hexafluoropropylene. These copolymers are available commercially from, for example, Atochem North America as Kynar FLEX. This polymer composition is preferred for both the preparation of the electrodes and the separator membrane.

The plasticizer appropriate for use in unitary secondary lithium batteries should be at least partially compatible with the polymer matrix to allow one to control melting during the battery lamination step, and must have a very low vapor pressure to prevent evaporation during handling and storage. The main role of the plasticizer is to impart solvent-presence memory by inducing the formation of a looser, less entangled, and less crystalline structure. The plasticizer allows the polymeric material to exhibit enhanced swelling when contacted with a liquid electrolyte solution, preferably following the extraction of at least a portion of the plasticizer.

Plasticizers for use in the present invention include, for example, dibutyl phthalate, dimethyl phthalate, diethyl phthalate, trisbutoxyethyl phosphate, propylene carbonate, ethylene carbonate, trimethyl trimellitate, mixtures of these, and the like.

Inorganic fillers, such as fumed alumina or silanized fumed silica, may be used to enhance the physical strength and melt viscosity of the solid state components, i.e., both electrodes and separator membrane and, in some compositions, to increase the subsequent level of electrolyte solution absorption.

Active materials for inclusion in the positive electrode include $Li_xMn_2O_4$, $LiCoO_2$ and $LiNiO_2$.

Active materials for inclusion in the negative electrode include petroleum coke, microbead carbon coke, synthetic graphite, natural graphite, synthetic graphitized carbon fibers and synthetic graphitized carbon whiskers. Active materials for use in the negative electrode may further include oxides of tungsten, oxides of molybdenum, chalcogenides of titanium or chalcogenides of molybdenum.

Once the polymer composition and plasticizer, along with any adjuncts, have been mixed, the materials are then formed into the battery elements. Any common procedure for casting or forming films or membranes of polymer compositions may be employed in the preparation of the present battery elements. Where casting or coating of a fluid composition is used, e.g., with meter bar or doctor blade apparatus, the viscosity of the composition will normally be reduced by the addition of a readily evaporated casting solvent, such as tetrahydrofuran (THF), acetone, or the like. Such coatings are normally air-dried at moderate temperature to yield self-supporting films of homogeneous, plasticized copolymer compositions.

A membrane material, particularly useful as a separator element, may also be formed by allowing the copolymer in commercial form, i.e., bead or powder, to swell in a proportionate amount of plasticizer solvent and then pressing the swollen mass between heated (e.g., about 130° C.) plates or rollers, or extruding the mixture.

Alternative methods of forming the battery components include hot melting, slurry casting, pressing, and skiving.

The battery layers may be processed as hot melts rather than cast solvent slurries much like plastic sheets are fabricated. First, for battery applications, it is desirable to maximize the amount of active material content in the electrodes. These high solids content compositions are dissimilar to traditional plastics which are made primarily of polymer. Thus, the electrodes of the present invention are difficult to draw down to a given thickness in the hot melt state. The preferred film fabrication method is to extrude the previously fluxed material from a low shear extruder or pump directly onto a chilled roll or calender where it is rolled to the final thickness.

All mixes should be heated to at least 150° C. in order to fully melt the PVdF copolymer and maximize the strength of the compounds and minimize plasticizer exudation. However, the temperature should not be too high, otherwise the unstabilized PVdF copolymer might undergo degradation.

The processing ease of the three layers seems to be inversely related to their relative melt viscosities with decrease in the order of cathode, anode, separator. Thus, the separator is most easily fabricated as a case sheet while the cathode may be most difficult. An alternative to this method of fabrication is "skiving."

In an alternative embodiment, a polymeric material having an intrinsic affinity toward the carbonate ester solution of lithium salts can be used as the electrode material binder and the electrolyte matrix. Intrinsic affinity as used herein refers to a material which swells upon contact with a lithium salt solution. Such materials may be processed into battery elements and single-cell battery laminates in the absence of a plasticizer, thus speeding up the battery fabrication process. With the use of these materials, the extraction process would still be highly desirable, as it removes extraneous materials, additives and contaminants, including low-molecular-weight components that would interfere with reliable operation of the battery after activation.

In this alternative embodiment, solid components of the positive and negative electrode should be thoroughly mixed with a liquid electrolyte-swellable polymeric matrix material, for example, chemically or radiation-cross-linkable silicone rubber or other non-crystalline rubber, and a cross-linking agent, followed by shaping of these materials into thin sheets. Similarly, the rubber material can be processed into a thin separator sheet in the presence of a small amount of cross-linking agent. The three layers (the cathode, the separator, and the anode) may be pre-crosslinked, stacked, and bonded by a final crosslinking step using, for example, heat and pressure or irradiation by ionizing particles. e.g., an electron beam.

Since all known cross-linking agents are expected to interfere with the operation of lithium ion batteries due to their high chemical reactivity, these components and any other contaminants may be removed by extraction in an appropriate solvent. Following drying, the lightly cross-linked single-cell laminate can be activated by immersion in a lithium salt solution in, for example, carbonate ester solvents. The light cross-linking of the rubbery component makes it swell in the solution while preventing the matrix from dissolving in the organic solvents during the extraction and activation steps. The crosslink density of the polymer rubber matrix is preferably between 0.1 and 10 mol% of the crosslinking agent. The crosslink density is selected to balance the incomplete crosslinking of the product and the capability of the polymer to swell in the electrolyte salt solution.

Extraction is a chemical process in which a component of a solid or a liquid mixture is transferred into another phase, usually the liquid phase, from which it may be readily recovered. Extraction processes have, as discussed above, been employed in the production of microporous lead-acid battery separators. These previous separators have been prepared by blending a polymer, usually polyethylene or polypropylene matrices, with one or more liquid or solid components. This blend is usually not a homogeneous material. Both polyethylene and polypropylene are incompatible with most known plasticizers at room temperature. As a result, even if a homogeneous blend were achieved with these polymers, the resultant materials undergo phase separation after cooling, thus resulting in a polymer matrix containing a large number of microscopic voids, or pools, of liquid more or less uniformly dispersed in the matrix. After shaping of this blend into a thin-sheet form, the liquid contained in these microporous is extracted with a liquid solvent which does not dissolve the polymer matrix, followed by drying. The dried sheet material will be a polymer matrix having dispersed therein a plurality of interconnected micropores. These micropores are filled with a liquid electrolyte in the finished battery, thus resulting in conduction paths for ions being transferred between the active elements of the battery during the charge and discharge cycles. This polymer blend may also contain a dispersion of a solid material, or filler, in the form of colloidal particles of inorganic materials, such as silica, alumina, clays, carbon, metal oxides, etc. These filler particles may be left in the polymer matrix after the extraction process, thus acting as a mechanical reinforcement to the polymer skeleton, or they may be extracted or otherwise removed, for example, by dissolution, to form additional micropores.

In one embodiment of the present invention, the polymer matrix is fully compatible with the plasticizing component on a molecular level, thus resulting in a homogeneous mixture. During the extraction step, the plasticizer is selectively removed by extraction with an appropriate solvent which solvent does not dissolve the polymer matrix. During and after the extraction, the polymer matrix collapses to form a non-porous material having a density close to that of a pure polymer material, but preserving the molecular memory of the presence of the plasticizer. Generally, this means that the physical arrangement of the polymer chains in the extracted polymer material is less entangled than that in the same solid polymer material obtained by, for example, processing without a plasticizer present. As a result, the extracted, collapsed polymer matrix is capable of imbibing a significantly larger volume of a liquid component, e.g., a liquid electrolyte salt, than a matrix from the same polymer processed without a plasticizer present.

The liquid extraction process removes not only the plasticizer whose presence in the finished battery product may be deleterious to battery performance, but also the majority of other extraneous materials, additives and contaminants present due to inclusion in processing aids or as the result of side reactions, thus allowing manufacture of the battery structure to proceed under uncontrolled environmental conditions until activation of the structure by inclusion of the electrolyte salt.

The solvents appropriate for use in the present invention include, but are not limited to, diethyl ether, petroleum ether, hexanes, cyclohexane, low and medium-boiling-hydrocarbon fractions, methanol, ethanol, propanes, methylene chloride, trichloroethylene, Freon fluorinated hydrocarbons®, ligroin, trichloroethane and mixtures thereof.

The solvent which can be used to extract the battery laminate, is selected based upon a number of factors. The solvent for use in the extraction method should preferably be a non-solvent for the polymeric matrix while being a very good solvent for the plasticizer. It should be a liquid with a low boiling point to provide more rapid drying of the extracted matrix. The solvent should also preferably have a low viscosity to allow rapid extraction. The solvent should preferably be inexpensive and have low toxicity. Finally, the solvent should preferably have a low fire hazard risk to render it workable in this environment.

All solvents may be recycled by flash distillation. Depending upon the laminate/solvent ratio, two or three 5 to 10-minute extraction steps in any of the above-listed solvents are sufficient to remove a plasticizer, preferably DBP, from the unitary lithium battery structure.

For small scale treatments, e.g., laboratory experiments and small scale production, diethyl ether is preferred due to its fast and complete extraction and rapid evaporation rate. On a larger developmental scale, low-boiling hydrocarbons, e.g., hexanes, petroleum ether, cyclohexane, and lower alcohols, e.g., ethanol, methanol and the like are preferred. Methanol, ethanol and hexanes are most preferred.

Extraction is preferably carried out at a temperature ranging from ambient to the boiling point of the solvent. More preferably, it is carried out at a temperature of from 0° to 30° C. In a preferred embodiment of the extraction process, the solvent is heated to a temperature below its boiling point, to accelerate the extraction process. Preferably, vigorous stirring, either by mechanical means, or, by bubbling air or nitrogen gas through the extraction vessel, is used to accelerate the extraction process.

Extraction can be carried out in any art recognized manner for example by using batch processes or continuous extraction, for example, countercurrent extraction. Extraction may also be carried out in any art recognized apparatus, for example, in a Soxhlet apparatus.

In an alternative embodiment of the present invention, supercritical fluid extraction process can be used. Supercritical extraction is an extraction process using an easily condensed gas, such as carbon dioxide, propane or nitrous oxide, as a solvent, at a temperature above its critical point.

At such temperatures, the liquid and gas phases cease to coexist resulting in the formation of a single phase often exhibiting unique solvating properties.

In one preferred embodiment, carbon dioxide is used, which effectively behaves like hexane as far a solvent properties are concerned. Cosolvents such as alcohols can be added to improve the polarity/solvating power.

The advantage of supercritical fluid extraction (SFE) is the very low cost of solvent materials, i.e., $CO_2$, the low temperature of the process (35° to 45° C.), the ease of separation the solvent is removed just by lowering the pressure), and recyclability or disposability of solvent materials. Other fluids which may be used as alternatives to $CO_2$ include nitrous oxide ($N_2O$), propane and other compounds that have near-ambient critical temperatures.

In existing processes, safety concerns have led to a limited use of nitrous oxide extractions. $N_2O$ and propane have some advantages over $CO_2$ in that they can dissolve more polar material than $CO_2$, and thus eliminate the need to use entrainers, i.e., cosolvents. Using entrainers may limit some of the advantages of supercritical fluids. For example, after the SFE solvent is removed, the sample is left saturated with a less volatile solvent which then may have to be removed.

SFE may be well suited to extraction of DBP and other plasticizers during the fabrication of the plastic Li-ion batteries of the present invention. It can reduce the use of volatile organic solvents, and leaves an open, microporous polymer matrix structure which may be beneficial to the performance characteristics of the battery.

The appropriateness of the extraction solvent can be determined by selecting a compatible solvent and extracting a laminated battery structure using 100 mL of the selected solvent and stirring at 500 rpm. 3.5 ml aliquots of the extract are then withdrawn after 0.5, 1, 2, 4, 9, 16, 25 ... min and their optical absorbance is determined between 300 and 250 nm (alternatively, absorbance at 274 nm, a local DBP absorption maximum, can be monitored); the liquid is returned to the extracting solvent.

The absorbance at 274 nm is plotted vs. $time^{1/2}$ and the slope of the linear part of the curve is determined (from 0 to 4–10 minutes, depending upon the solvent). The sample is then dried and weighed to determine the weight loss. Finally, the sample must be inspected to detect any signs of delamination or excessive weight loss which may be caused by polymer dissolution.

An alternative method for determining the appropriateness of the extracting solvent can be carried out by extracting a laminated battery, weighing about 2.5 g, using an amount, preferably 70 ml, of a selected solvent for 5 or 10 mins. with stirring. The extract from this step is discarded. The procedure is repeated with another 5 or 10 minute extraction, and the measurement of the optical absorbance of the extracting solvent is carried out at 274 nm. The absorption value should preferably be about 2 or less. It may be necessary to perform a third 5 to 10 minute extraction step after which the absorbance at 274 nm should be <0.1. The battery is then preferably dried for about 10 minutes under vacuum, activated with a liquid electrolyte solution, and tested.

Figure 1:
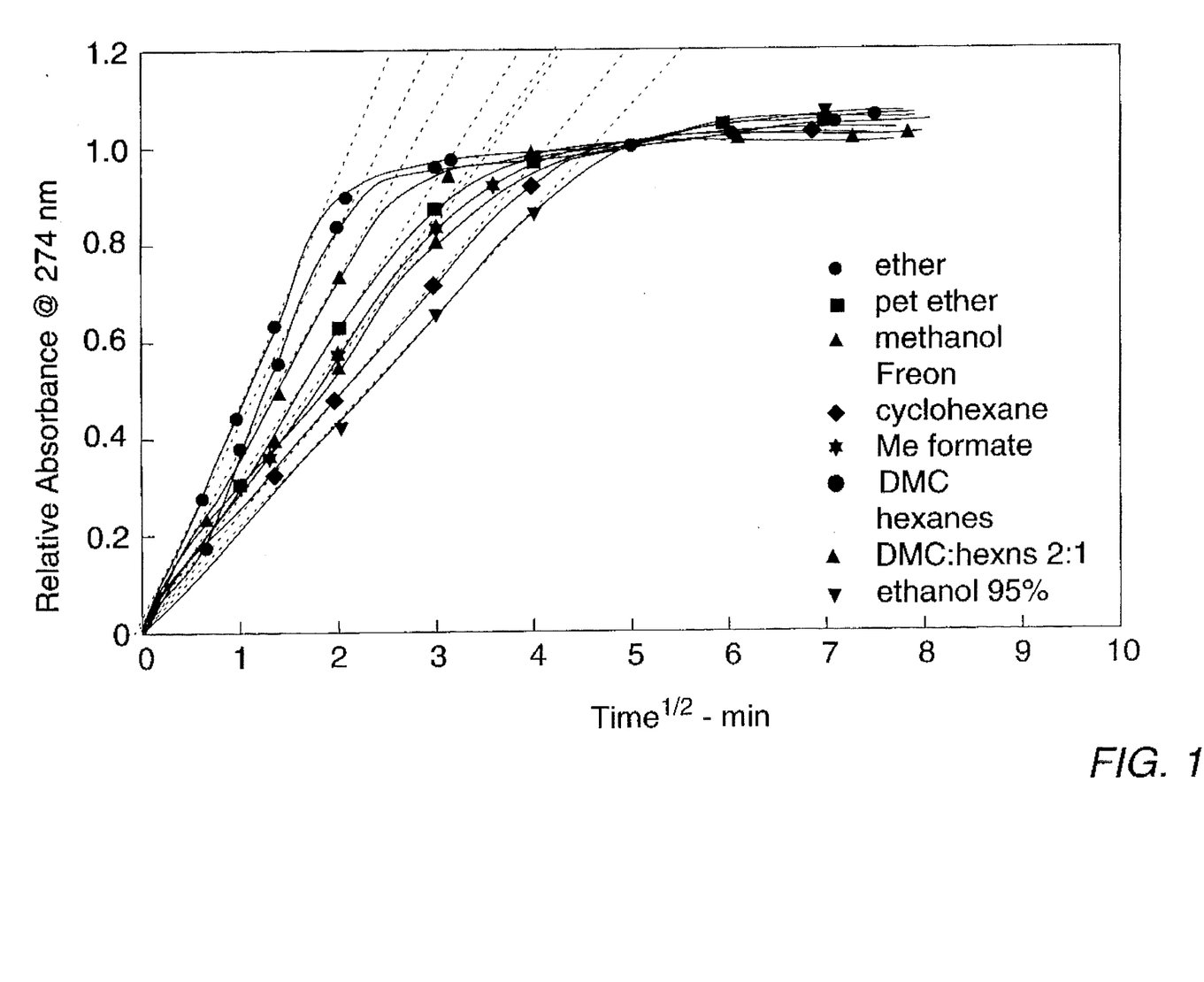
FIG. 1 is a plot of optical absorbance at 274 nm of extracted solvent vs. time$^{1/2}$ for laminated plasticized battery structures.

FIG. 1 represents a plot of the relative absorbance at 274 nm for a variety of solvents which were used for extraction of DBP from a laminated battery structure (~0.2–0.3 g std. battery /100 ml).

After extraction is completed, the dry battery must be activated with an electrolytic fluid. In a preferred embodiment, any adsorbed water and solvent residues are removed prior to activation by placing the extracted battery in an evacuated chamber at about 0.5–2.5 Pa for 10–30 min. This extracted and dried battery laminate may have highly porous areas in locations where sufficient solids are included within the polymer matrix, thus facilitating the rapid absorption of a liquid electrolyte solution by capillary action. The liquid initially contained in the pores serves as a reservoir from which the extracted polymer matrix picks up the liquid to attain equilibrium swelling.

In the preferred embodiment of the present invention, the dried, extracted battery laminate may be immersed in the liquid electrolyte for only 5–10 minutes to attain sufficient liquid content. The battery system undergoes full equilibration during the next few hours. This is preferably carried out in hermetic packaging.

Figure 2:
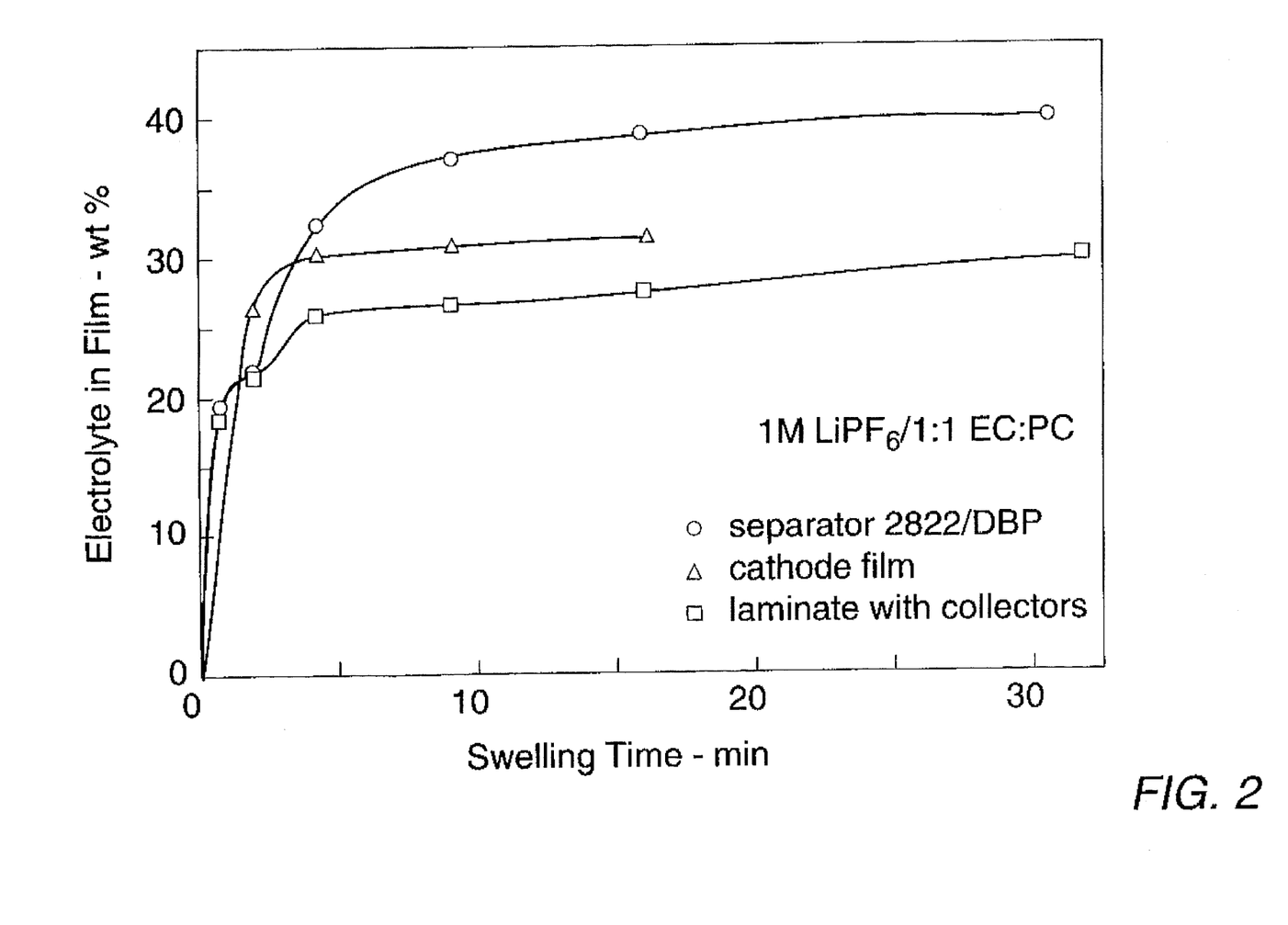
FIG. 2 is a plot of weight fraction of electrolyte vs. swelling time for extracted plastic battery elements.
Figure 3:
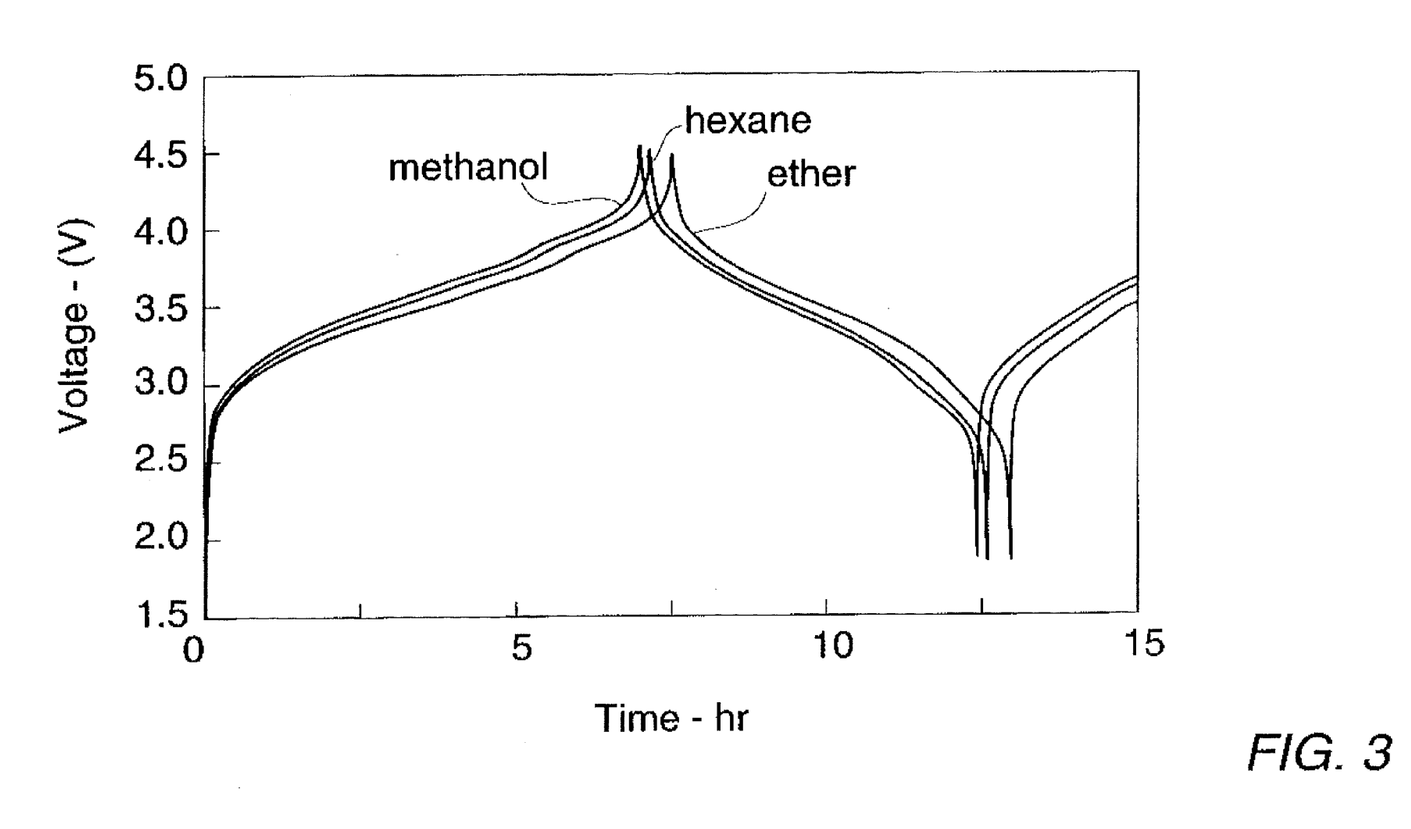
FIG. 3 is a plot showing the first cell cycle for a battery which was extracted with various solvents in voltage vs. time in hours.
Figure 4:
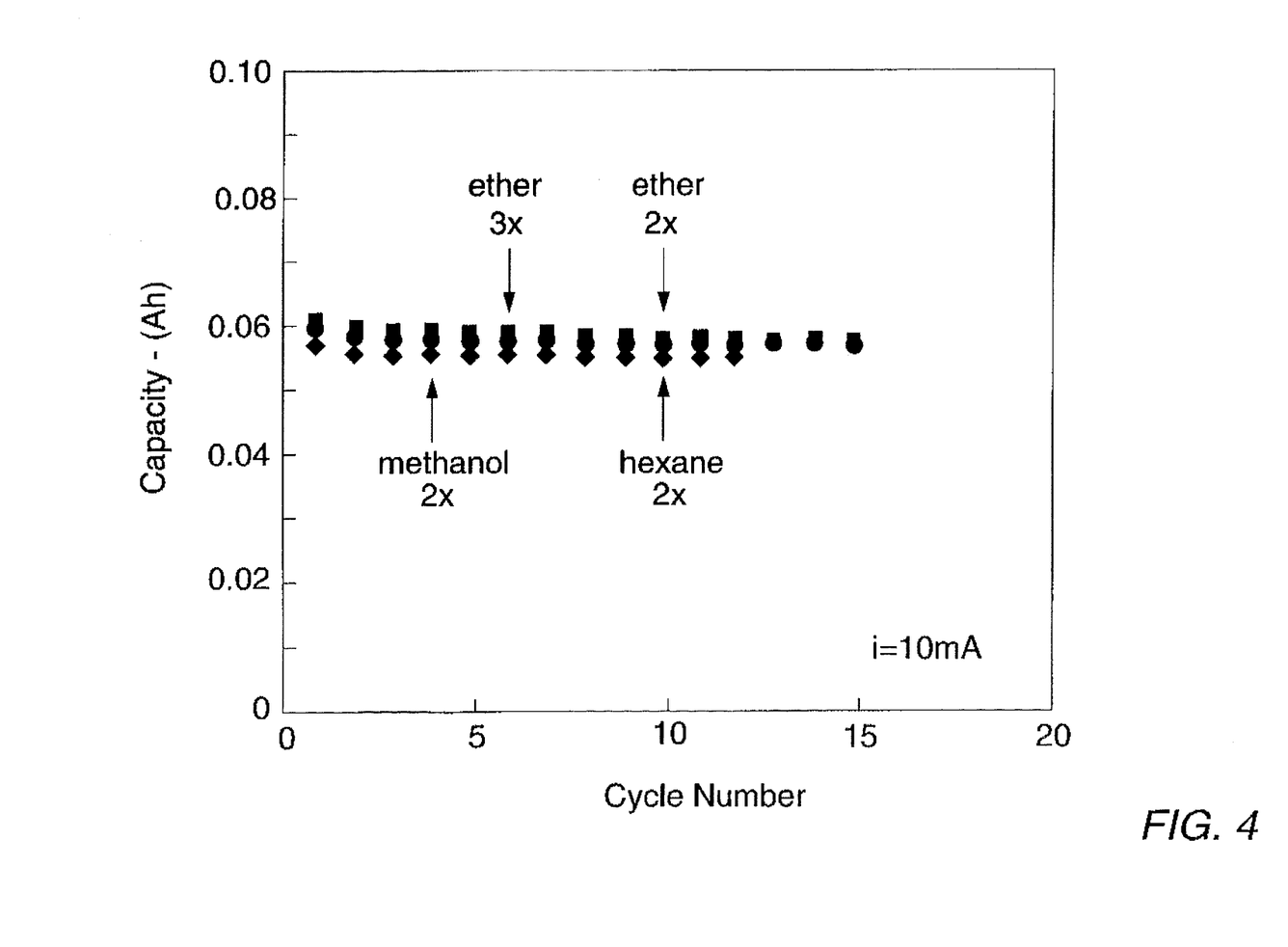
FIG. 4 is a plot of the cycle life of battery cells extracted with various solvents in capacity vs. cycle number.
Figure 5:
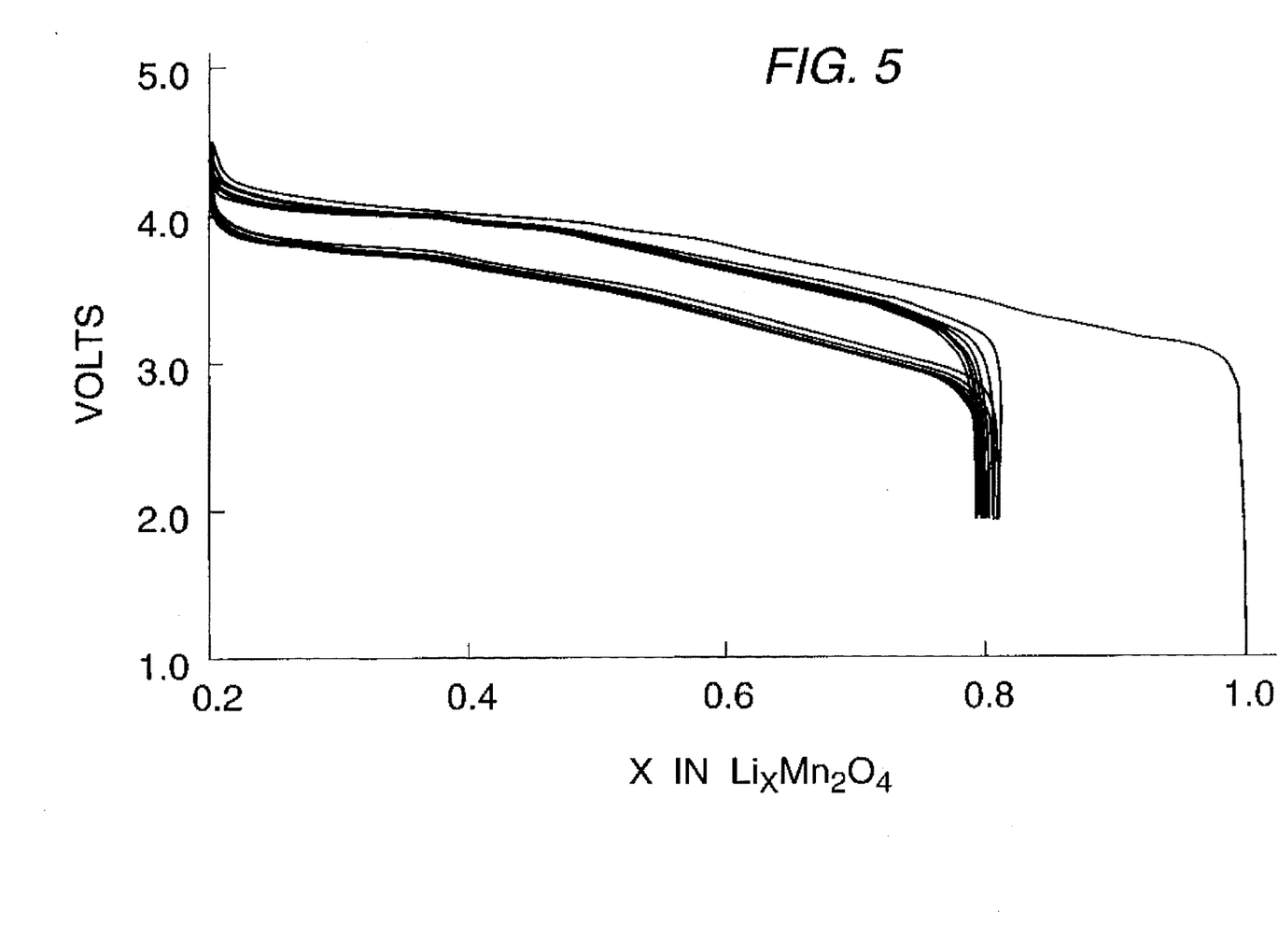
FIG. 5 is a plot of battery voltage vs. mole fraction of Li in $LiMn_2O_4$ for plastic battery elements extracted in ethanol and activated in $LiPF_6$.

FIG. 2 shows the weight fraction of electrolyte in the film vs. time to establish the swelling kinetics of different extracted plastic battery elements in $LiPF_6$ and EC/PC solvent.

EXAMPLE 1

A separator casting solution was prepared by dissolving 1.5 g of powdered Kynar FLEX 2750 P(VdF-15% HFP) copolymer and 1.5 g of dibutyl phthalate (DBP) in 10 mL acetone by heating it for 1 hr in a closed container to 50° C. The viscous solution was cooled to room temperature, and a film was cast on a glass plate using a doctor-blade apparatus gapped at 15 mils. After drying for 10 mins. in a slow stream of air, a flexible, strong, transparent, dry-to-touch film was obtained.

A film sample was cut, weighed, and extracted by shaking in a closed vial with diethyl ether for 10 mins. The ether was discarded, and the extraction repeated with fresh solvent (10 mL). The extracting solvent was discarded, and the film sample was dried for 10 mins. in a stream of air. The weight loss was 50.0±0.1%. The film contained 63 vol.% of DBP.

The extracted and dried film sample was placed for 1 hr in a vial filled with 1 M $LiPF_6$ solution in EC/DHC (1/2v/v). Next, the transparent film was removed from the solution, pressed lightly between two sheets of filter paper to remove the excess of electrolyte solution, and weighed. The film contained significantly less liquid (44 vol.%).

EXAMPLE 2

In another example, films cast from a 30/20/50 by wt. blend of Kynar FLEX 2822/fumed $SiO_2$/DBP in acetone followed by extraction with diethyl ether and drying, exhibit significantly higher electrolyte uptake than films cast without $SiO_2$. These films are capable of absorbing and retaining a significantly higher amount of a liquid electrolyte (60–70% vol.) which results in an improved ionic conductivity of such compositions. In addition, the presence of a finely divided inorganic filler acts to reinforce the film mechanically by decreasing its creep under stress, especially at elevated temperatures.

EXAMPLE 3

0.25±0.03 g of a battery laminate containing DBP (dibutyl phthalate) was extracted in 100 ml of a solvent selected from the following solvents: ether, petroleum ether, methanol, Freon fluorinated hydrocarbon, cyclohexane, methyl formate, DHC (dimethyl carbonate), hexanes, DMC:hexanes (2:1), and 95% ethanol, at 23° C. The sample was supported in the liquid on a coarse stainless steel mesh. The laminated battery structure was contacted with 100 ml of the selected solvent and stirred vigorously for 100 min. 3.5 ml aliquots of the extracting solvent were withdrawn between 1 and 100 minutes. The absorbance was measured at 274 nm and the liquid was returned to the extracting solvent.

The absorbance at 274 nm was plotted vs. time$^{1/2}$ and the slope of the linear part of the curve was determined. See the results set forth in FIG. 1. The sample was then dried and weighed to determine the weight loss of the sample. Finally, the sample must be inspected for any signs of delamination or excessive weight loss. The results of those measurements are set forth in Table 1 below.

| extracting solvent | b.p. °C. | weight loss wt. % | slope a.u./min$^{1/2}$ | comments |
|---|---|---|---|---|
| Me formate | 35 | 29.8* | 0.484 | delamin. |
| diethyl ether | 34 | 26.5 | 0.413 | |
| DMC | 90 | 29.8* | 0.341 | delamin. |
| pet. ether | 35–60 | 26.4 | 0.313 | |
| methanol | 64 | 26.7 | 0.303 | |
| hexanes | 68-70 | 26.8 | 0.281 | |
| cyclohexane | 81 | 26.1 | 0.245 | |
| Freon | 24 | 27.2 | 0.242 | |

*weight loss suggests partial polymer dissolution

EXAMPLE 4

The three battery layer compounds were prepared by first masterbatching all the high surface solids on a two roll mill (with limited plasticizer and resin), then diluting the masterbatch with the rest of the plasticizer and resin on a Brabender mixer to correct proportions. In the case of the anode and separator compounds, the resulting batteries were indistinguishable from those prepared using solvent-cast methods. Consequently it should be possible to mix these two materials using plastics processing equipment.

The SP carbon black was dispersed using the above mixing protocol and it was noted that the volume resistivity had increased from the expected 4 Ω-cm to 2000 Ω-cm. It should still be possible to carefully flux the material in a low shear mixer and pump it through a die without increasing the resistivity, but this is not a routine production path.

Another way of preparing the cathode electrode without solvent in the correct thickness range is by skiving. The material is shaped into a cylindrical billet, mounted in a lathe and then peeled against a rigid blade to give a continuous tape. With the proper machinery the thickness can be held to tight tolerances. Skived Teflon tape, for instance, is available in thicknesses down to about 0.05 mm with a precision of +/−12 μm.

A cathode preform was prepared by first homogenizing the powders along with half the DBP plasticizer in a Waring blender. The rest of the DBP was then manually stirred in, to give a damp powder that was compression molded in a cylindrical mold about 75 mm wide × 0.6 m high at 150° C. The molded cylinder was then fastened to an arbor, mounted in a lathe and peeled with a wood plane adjusted to give a 0.25 mm thick tape. The tape was easily handled, showed no imperfections and was quite strong. It had a textured surface not unlike that of cast films but was not as smooth as compression molded ones. There were no signs of plasticizer exudation. The filled material lightly abraded the sole of the plane where it contacted the preform but a hardened steel or carbide rubbing block would have minimized that problem.

A cylindrical preform 0.6 m in diameter that is skived down to 0.3 m will produce about 0.8 km of 0.25 mm thick tape. (If the preform were 0.3 m wide, that would supply enough cathode for a single 30 KWh EV battery.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a battery structure comprising:
   a) forming a solid state positive electrode of a polymer, a plasticizer and an active material;
   b) forming a solid state negative electrode of the same polymer, a plasticizer and an active material;
   c) forming a separator membrane of the same polymer and a plasticizer;
   d) bonding said electrodes and said separator membrane to form a unitary battery structure;
   e) extracting a portion of said plasticizer from at least said separator membrane; and
   f) activating said battery by reswelling at least said separator membrane by contacting said unitary battery structure with an electrolytic salt solution.

2. The method of claim 1 wherein said extraction is carried out under supercritical extraction conditions.

3. The method of claim 1 wherein said plasticizer is selected from the group consisting of dibutyl phthalate, dimethyl phthalate, diethyl phthalate, trisbutoxyethyl phosphate, propylene carbonate, ethylene carbonate, trimethyl trimellitate and mixtures thereof.

4. The method of claim 1 wherein said polymer is selected from the group consisting of polymer and copolymers of vinyl chloride, acrylonitrile, vinyl chloride and vinylidene chloride, vinyl chloride and acrylonitrile, vinylidene fluoride, vinylidene fluoride with hexafluoropropylene, vinylidene fluoride with hexafluoropropylene and a member of the group consisting of vinyl fluoride, tetrafluoroethylene, and trifluoroethylene.

5. The method of claim 1 wherein said active material in said positive electrode is selected from the group consisting of $Li_xMn_2O_4$, $LiCoO_2$ and $LiNiO_2$.

6. The method of claim 1 wherein said active material in said negative electrode is selected from the group consisting of petroleum coke, microbead carbon coke, synthetic graphite, natural graphite, synthetic graphitized carbon fibers and synthetic graphitized carbon whiskers.

7. The method of claim 1 wherein said active material in said negative electrode is a low-voltage lithium intercalation compound selected from the group consisting of oxides of tungsten, oxides of molybdenum, chalcogenides of titanium or chalcogenides of molybdenum.

8. The method of claim 1 wherein said electrolytic salt is selected from the group consisting of lithium salt of perchlorate, tetrafluoroborate, hexafluorophosphate, hexafluoroarsenate, hexafluoroantimonate, bis(trifluorosulfon)imide, tri(trifluorosulfono)methide, and mixtures thereof.

9. The method of claim 1 wherein said solvent for extracting said plasticizer is selected from the group consisting of ether, diethyl ether, hexanes, petroleum ether, ligroin, hexanes, cyclohexane, methanol, ethanol, dichloromethane, trichloroethylene, trichloroethane, and mixtures thereof.

10. The method of claim 1 wherein the extraction step is carried out at a temperature range from ambient to the boiling point of the solvent.

11. The method of claim 1 wherein the extraction step is carried out in a Soxhlet apparatus.

12. The method of claim 1 wherein said plasticizer is removed from said positive electrode, said negative electrode and said separator membrane.

13. The method of claim 12 wherein said reswelling is carried out on said positive electrode, said negative electrode and said separator membrane.

14. The method of claim 2 wherein the solvent is selected from the group consisting of carbon dioxide, propane and nitrous oxide.

15. The method of claim 14 further comprising a cosolvent.

16. The method of claim 2 wherein the extraction step is carried out at a temperature from about 0° C. to about 30° C.

17. The method of claim 1 wherein the battery is dried under vacuum before activation with the lithium salt solution.

18. The method of claim 1 wherein said polymeric material further comprises a finely divided inorganic filler.

19. The method of claim 1 wherein said solid state positive electrode is formed by casting a slurry comprising the positive active material, said polymer, said plasticizer of the polymer, a conductive carbon, and a low boiling solvent.

20. The method of claim 1 wherein said solid state positive electrode is formed by pressing at an elevated temperature a dry, homogeneous mixture comprising the positive active material, said polymer, said plasticizer of the polymer, and a conductive carbon, to form a thin plastic electrode film.

21. The method of claim 1 wherein said solid state negative electrode is formed by pressing at an elevated temperature a dry homogeneous mixture comprising the negative active material, said polymer, said plasticizer of the polymer, and a conductive carbon to form a thin plastic electrode film.

22. The method of claim 1 wherein said solid state positive electrode is formed by pressing at an elevated temperature a dry powdered homogeneous mixture comprising the positive active material, said polymer, said plasticizer of said polymer, and a conductive carbon, to form a solid cylindrical block of the cathodic material, said material being shaped into a thin continuous film by skiving on a lathe with a sharp knife.

23. The method of claim 1 wherein said solid state negative electrode is formed by pressing at an elevated temperature a dry, powdered, homogeneous mixture comprising the negative active material, said polymer, said plasticizer of said polymer, and a conductive carbon, to form a solid cylindrical block of the anodic material, said material being shaped into a thin continuous film by skiving on a lathe with a sharp knife.

24. The method of claim 1 wherein said plastic electrolyte is formed by pressing at an elevated temperature, a dry, homogeneous mixture comprising said polymer matrix, said plasticizer of the polymer, and said inorganic, finely divided filler to form a thin plastic electrode film.

25. A method of making a battery structure comprising:
  a) forming a positive electrode of a copolymer of VdF and HFP, $LiMn_2O$ and DBP;
  b) forming a negative electrode of a copolymer of VdF and HFP, carbon and DBP;
  c) forming a separator membrane of a copolymer of VdF and HFP with DBP;
  d) laminating said electrodes and said separator membrane under heat and pressure to form a unitary battery structure;
  e) extracting at least a portion of said DBP from said battery structure with a solvent;
  f) drying said battery in a stream of air;
  g) placing said battery under vacuum for from 0 to 30 minutes; and
  h) activating said battery by reswelling said battery structure with a lithium salt electrolytic solution.

26. The method of claim 25 wherein the extracting solvent is diethyl ether.

\* \* \* \* \*